(12) United States Patent
Dine et al.

(10) Patent No.: US 6,986,713 B2
(45) Date of Patent: Jan. 17, 2006

(54) PROPELLER SHAFT

(75) Inventors: Donald W. Dine, Rochester Hills, MI (US); Craig A. Campbell, West Bloomfield, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 10/644,442

(22) Filed: Aug. 20, 2003

(65) Prior Publication Data

US 2005/0043105 A1 Feb. 24, 2005

(51) Int. Cl.
  *F16C 3/02* (2006.01)
(52) U.S. Cl. ...................... 464/181; 464/183
(58) Field of Classification Search .......... 464/180, 464/181, 183, 52, 53, 89; 138/115–117
See application file for complete search history.

(56) References Cited

U.S. PATENT DOCUMENTS

| | | | | |
|---|---|---|---|---|
| 2,017,609 | A | * | 10/1935 | Sparrow ................. 464/180 X |
| 2,466,440 | A | * | 4/1949 | Kiekhaefer ............... 464/89 X |
| 2,516,020 | A | * | 7/1950 | Reed |
| 2,915,306 | A | * | 12/1959 | Hickman ................. 464/89 X |
| 2,929,408 | A | * | 3/1960 | Smith et al. ............ 138/115 X |
| 3,110,754 | A | * | 11/1963 | Witort et al. ........... 138/115 X |
| 4,272,971 | A | | 6/1981 | Loyd et al. |
| 4,609,154 | A | * | 9/1986 | Rinkewich .............. 138/115 X |
| 4,838,833 | A | | 6/1989 | Coursin |
| 5,227,585 | A | * | 7/1993 | Zen ....................... 138/115 X |
| 5,260,522 | A | | 11/1993 | Vogt et al. |
| 5,839,961 | A | * | 11/1998 | Andress .................. 464/183 X |
| 5,924,531 | A | | 7/1999 | Stark et al. |
| 6,010,407 | A | * | 1/2000 | Ishikawa ................ 464/183 X |
| 6,234,911 | B1 | | 5/2001 | Breese et al. |
| 6,287,209 | B1 | | 9/2001 | Nakajima et al. |
| 6,370,756 | B1 | | 4/2002 | Conger et al. |
| 6,409,606 | B1 | | 6/2002 | Nakajima et al. |
| 6,450,890 | B1 | * | 9/2002 | Hendrian et al. ........... 464/180 |
| 2002/0128080 | A1 | | 9/2002 | Russell |
| 2003/0144062 | A1 | * | 7/2003 | Holemans et al. .......... 464/181 |

* cited by examiner

Primary Examiner—Greg Binda
(74) Attorney, Agent, or Firm—Jennifer M. Brumbaugh; Mick A. Nylander

(57) ABSTRACT

A propeller shaft assembly includes a thin-walled tubular member, a connecting member fixed to each end of the tubular member, and a support member fixed within the tubular member. The support member includes a plurality of radial elements extending a first length (L1) within the tubular member and engaging an interior surface of the tubular member to increase the bending frequency of the propeller shaft assembly. In one example, the support member includes a central hub coaxially located within the tubular member and the radial elements extend from the central hub to the interior surface of the tubular member. The radial elements can include enlarged end portions for engaging the interior surface of the tubular member. The radial elements, at their ends, can also include either axial or circumferential grooves which act as an adhesive reservoir.

15 Claims, 2 Drawing Sheets

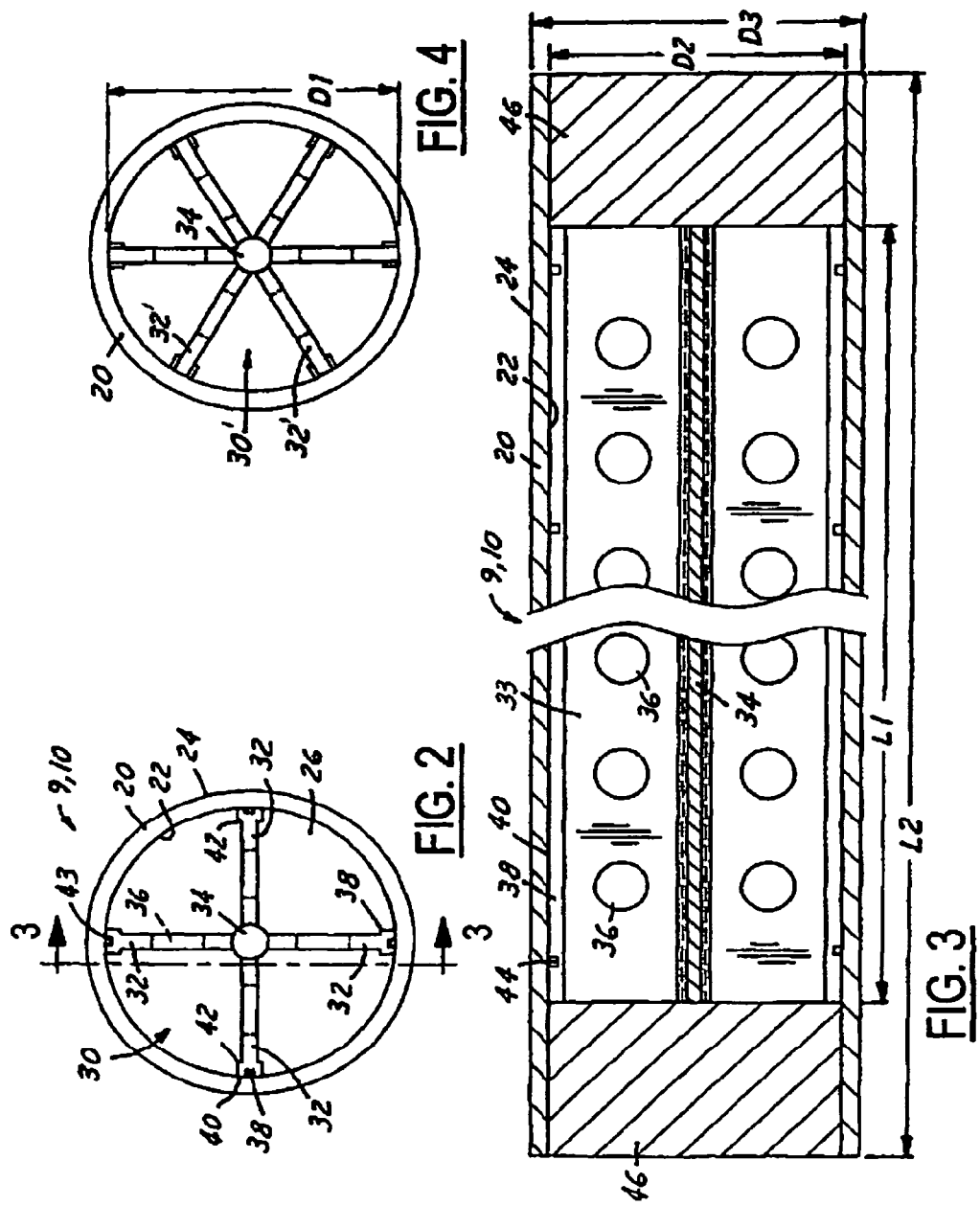

PROPELLER SHAFT

TECHNICAL FIELD

The present invention relates to propeller shaft assemblies for motor vehicles. In particular, the invention concerns a driveline propeller shaft assembly with a stiffening feature.

BACKGROUND OF THE INVENTION

Vehicle drivelines typically include constant velocity joints, cardan joints, side shafts and propeller shafts in various configurations to provide motive power for the vehicle. Constant velocity fixed joints are known in various designs. Such joints are used primarily in the driveline of a motor vehicle for driving the wheels of a motor vehicle. They can be used in either propeller shafts or in side shafts. Side shafts extend from the axle drive to the driven wheels; for example, they connect the output ends of the rear axle differential with the driven wheel hubs of the wheels. Propeller shafts serve to transmit the drive from the gearbox output of the front wheel drive unit to the rear axle differential associated with the rear axle.

As far as propeller shafts are concerned, a number of different designs are used. They may comprise, for example, a shaft with two joints which are arranged at the ends of the shaft which serve to be connected to the gearbox output in front, and to the drive input at the rear. Multi-section propeller shafts are also common. For example, two propeller shaft portions can be connected by a center bearing or intermediate bearing. Normally, at the ends of the propeller shafts, i.e., towards the gearbox Normally, at the ends of the propeller shafts, i.e., towards the gearbox output and the drive input, there are arranged universal joints. It is also possible for a universal joint to be provided in the central region. A constant velocity plunging joint can also be provided in the central region. The propeller shafts themselves typically are made of metal, although carbon fiber and other materials have also been used.

The drive unit of the motor vehicle generates vibrations which, in prior art assemblies, are transmitted to the propeller shaft in the form of movement vibrations and structure-borne sound. Moreover, vibrations are induced from the relatively high rotational speeds of the propeller shafts themselves. In addition, changing torque values and rotational speeds constantly occur during the transmission of the rotational movement throughout the driveline assembly. Load values suddenly increasing to 10 times the nominal torque, and rotational speeds up to 10,000 revolutions per minute are not rare.

To reduce the transmission of vibration and structure-borne sound to the vehicle compartment, multi-sectional propeller shafts are typically used with an intermediate or center bearing located at a nodal point along the propeller shaft assembly. Dynamic dampers are also used along an intermediate portion of multi-sectional propeller shafts to minimize vibrations. In some cases, it would be preferable for packaging concerns, or cost/weight concerns to employ a smaller diameter propeller shaft. There also exists a need for a more rigid propeller shaft to permit longer shafts without the need for an intermediate bearing or dynamic damper.

SUMMARY OF THE INVENTION

The present invention provides a propeller shaft having improved structural rigidity. The propeller shaft assembly includes a thin-walled tubular member, a connecting member fixed to each end of the tubular member, and a support member fixed within the tubular member. The support member includes a plurality of radial elements extending a first length (L1) within the tubular member and engaging an interior surface of the tubular member to increase the bending frequency of the propeller shaft assembly. In one example, the support member includes a central hub coaxially located within the tubular member, and the radial elements extend from the central hub to the interior surface of the tubular member. The radial elements can include enlarged end portions for engaging the interior surface of the tubular member. The radial elements, at their ends, can also include either axial or circumferential grooves which act as an adhesive reservoir. The radial elements can also include openings formed along their length to reduce the weight of the support member.

In another embodiment, a power transmission shaft is provided. The shaft includes a thin-walled metal or reinforced plastic tube having a joint element or stub shaft fixed to each end thereof, and a support member co-axially located within the tube and engaging an interior surface of the tube. The support member includes a central hub and a plurality of radial elements extending between the central hub and the interior surface. Each radial element includes an end portion for engaging the interior surface.

In another example, a power transmission shaft comprising a thin-walled metal or reinforced plastic tube having a joint element or stub shaft fixed to each end thereof, and a support member co-axially located within the tube and engaging an interior surface of the tube is provided. The support member includes a central hub and a plurality of radial elements extending between the central hub and the interior surface. The plurality of radial elements are equally spaced around the circumference.

The present invention is advantageous in that the propeller shaft can be made longer while at the same time reducing or eliminating bending vibrations within the vehicle driveline. Because of the improved rigidity, smaller diameter shafts can potentially be used in the driveline as well.

Other advantages of the invention will become apparent to one of skill in the art upon reading the following detailed description and with reference to the drawings illustrating features of the invention by way of example.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 2 is a cross-sectional view of a propeller shaft in accordance with one embodiment of the present invention.

FIG. 3 is a longitudinal sectional view of the propeller shaft of FIG. 2.

FIG. 4 is a cross-sectional view of another embodiment of a propeller shaft in accordance with the present invention.

DETAILED DESCRIPTION OF THE INVENTION

Figure 1:
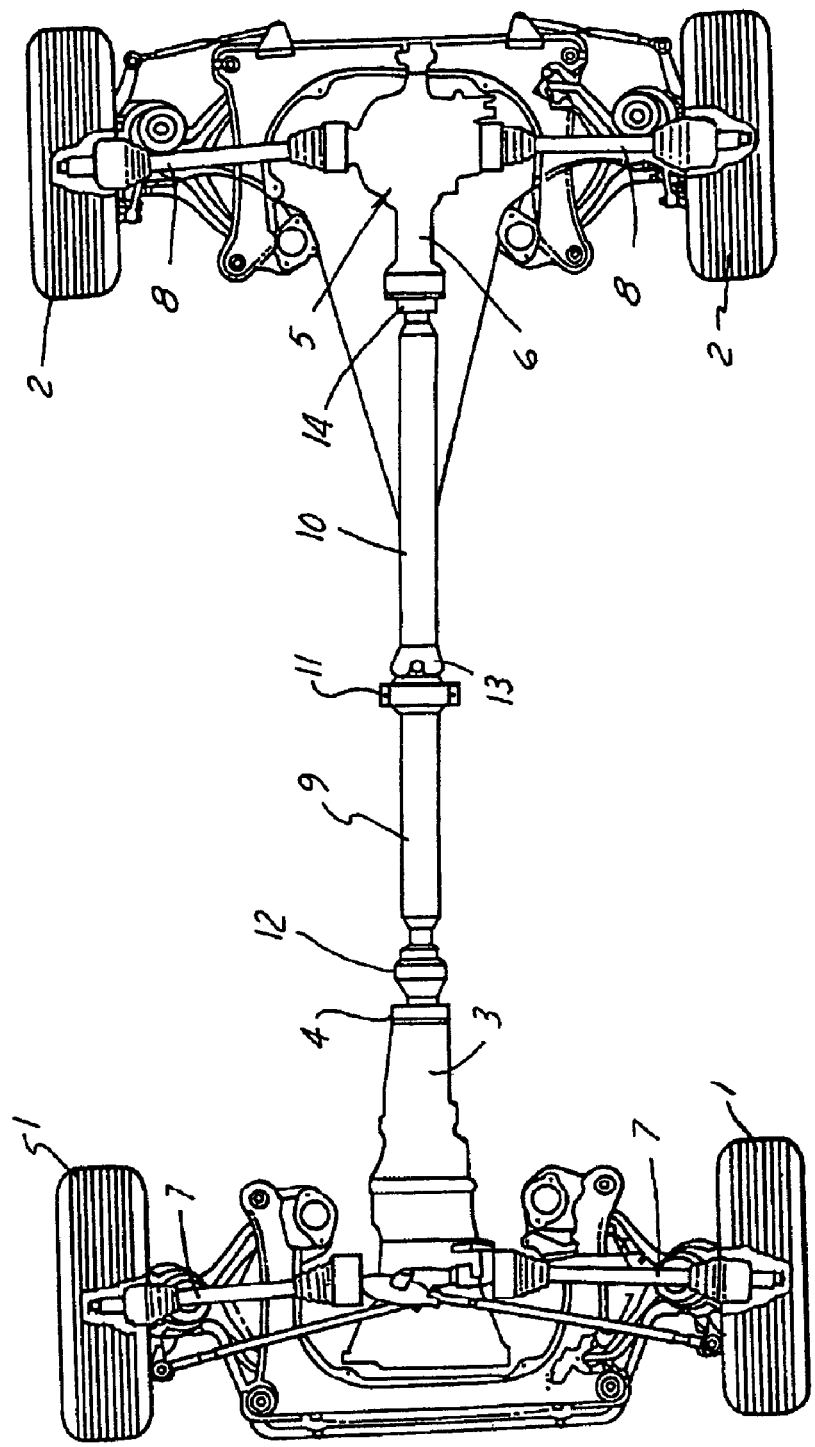
FIG. 1 is a diagrammatic illustration of a vehicle driveline having a propeller shaft assembly in which the present invention may be used to advantage.

In the following description, various operating parameters and components are described for one constructed embodiment. These specific parameters and components are included as examples and are not meant to be limiting.

While the invention is described with respect to a propeller shaft having improved rigidity within the driveline of a vehicle, the following apparatus is capable of being adapted to various purposes including automotive vehicles, motor systems that use a propeller shaft, or other vehicle and non-vehicle applications which require a rigid torque-transmitting shaft. Referring now to the drawings wherein like reference numerals are used to identify identical components of the various views, FIG. 1 illustrates a diagrammatic view of an exemplary driveline of a motor vehicle having a propeller shaft assembly in which the present invention may be used to advantage. The driveline assembly of FIG. 1 is illustrative of the environment in which a propeller shaft in accordance with the present invention may be used. Other driveline layouts may also be improved by use of the propeller shaft disclosed herein, including single unit propeller shaft arrangements or multi-section propeller shaft arrangements for rear wheel drive or four-wheel drive vehicles. The shaft in accordance with the present invention may also be used in side shaft assemblies, or in non-automotive torque shaft applications.

In the example of FIG. 1, there is shown a driveline for a four-wheel drive vehicle. The two front wheels 1 and the two rear wheels 2 are driven. FIG. 1 also shows the gear box 3 with the gear box output 4. In the region of the rear axle, there is provided the axle drive 5 with the drive input 6. The two front wheels 1 are driven by side shafts 7. The two rear wheels 2 are driven by the side shafts 8, starting from the axle drive 5. The connection between the gear box 3 and the axle drive 5 is provided by a propeller shaft assembly which comprises two propeller shaft portions 9 and 10. The propeller shaft assembly is additionally supported on the floor assembly of the vehicle by an intermediate bearing 11 which, in this example, is arranged approximately centrally. The intermediate or center bearing 11 can be a center bearing tuned absorber, i.e., a dynamic damper.

In the first propeller shaft portion 9, the propeller shaft assembly includes a first rotary joint 12 arranged near the gear box output 4. For connecting the two propeller shaft portions 9, 10, there is provided a second rotary joint 13. At the end of the second propeller shaft portion 10, there is arranged a third rotary joint 14 which, via a connecting mechanism, is connected to the drive input 6 of the axle drive 5 in the region of the rear axle. In many applications, the propeller shaft portions 9, 10 can rotate at a speed which is higher than the speed introduced by the engine into the manual or automatic gear box. The reduction of the speed for the rear wheels 2 takes place in the axle drive 5. Whereas, for example, the propeller shaft assembly with the propeller shaft portions 9, 10 and the associated the joints 12, 13, 14 may rotate at speeds of up to 10,000 revolutions per minute. The speeds of the side shafts 8 for driving the rear wheels 2 reach approximately up to 2,500 revolutions per minute.

Thus, the driveline assembly of FIG. 1 is a multi-sectional propeller shaft driveline assembly including two propeller shaft portions 9, 10, at least one of which is a propeller shaft having improved structural rigidity in accordance with the present invention. The present invention may also be used to advantage front-wheel drive, all-wheel drive, rear-wheel drive or other four-wheel drive driveline configurations. The improved propeller shaft of the present invention can also be used to advantage driveline assemblies having a singular propeller shaft (omitting the second joint 13), or propeller shaft assemblies having more than two propeller shaft portions. Indeed, due to the improved rigidity, the second joint 13 may not be necessary to provide the desired NVH (Noise, Vibration, and Harshness) characteristics of the driveline.

Referring now to FIG. 2, there is shown a cross-sectional view of a propeller shaft in accordance with one embodiment of the present invention. FIG. 2 shows the tubular middle portion of the propeller shaft assembly in accordance with the present invention which may form the middle portion propeller shaft 9 or 10 of FIG. 1, for example. A shaft 9, 10 includes a thin-walled hollow tube 20 having an interior surface 22 and an exterior surface 24. The interior surface 22 of the tube 20 defines an interior space 26. The tubular portion 20 of the shaft 9, 10 is typically made of metal, however, such hollow shafts have also been made of carbon fiber, fiber reinforced plastic or other carbon or chemical composites. The tubular portion 20 can be a single layer such as in the case of metal tubes or multi-layer such as in the case of fiber reinforced plastic or sheet-wrapped carbon configurations.

In the interior 26 of the tube 20, there is inserted a support member 30 which acts to increase the lateral stiffness of the tube, i.e., improve the rigidity of the tube 20 to thereby increase the bending frequency of the completed shaft assembly. The support structure 30 allows the shaft 9, 10 to be designed longer for a given diameter tube 20. The support member 30 includes a plurality of radial elements 32 which radiate outwardly an equal distance from a center hub 34. The center hub 34 is located coaxially within the tube 20. The radial elements 32 are arranged to form a spoke support structure similar to the spokes of a wheel. The radial elements 32 are thus equally circumferentially spaced about the interior surface 22 of the tube 20. The support member 30 is made of a lightweight metal or reinforced plastic having a high strength to weight ratio such that the resulting framework increases the lateral stiffness of the tube 20 with a minimum mass penalty. Suitable materials for the radial elements 32 and center hub 34 are metals such as aluminium, titanium, lightweight steel, and alloys or a combination thereof. The support member 30 can also comprise plastic, ceramic or graphite composites. To further reduce the weight of the support member 30, openings 36 can be formed along the length of the radial elements 32. The openings 36 can be axially spaced equi-distance from the center hub 34 and aligned laterally along the length of the tube 20 as shown in FIG. 3, or be laterally or axially offset from each other with respect to a common radial element 32 or an opposing or adjacent radial element 32. The number, size, and shape of the openings 36 can also be varied depending upon the particular application under consideration. Circular openings 36 such as shown in FIG. 3 are advantageous in that they are easily formed and do not compromise the structural integrity of the radial element 32 when, for example, lightweight metal is used for the radial element 32.

The outer end 38 of each radial element 32 contacts the inside surface 22 of the tube 20 and is secured to the tube 20 by friction (press-fit), adhesive, or a weld. To improve the contact between the interior surface 22 of the tube 20 and the ends 38 of the radial elements 32, the outer surface 40 of each end 38 can be contoured to correspond to the radius of the interior surface 22 of the tube 20. Each radial element 32 can also include a shoulder 42 at the outer end 38 such that the end 38 is circumferentially wider than the body of the radial element 32 as shown in FIG. 2. To ensure a good contact between the support member 30 and the interior surface 22 of the tube 20, the diameter (D1) of the support member 30 between opposing outer surfaces 40 of the radial elements 32 can be equal to, or slighter greater than, the inside diameter (D2) of the tube 20. In such cases, it may be acceptable that some slight deformation of the support member 30 or tube 20 occurs when the support member 30 is introduced into the tube 20.

Adhesives may also be used to secure the support member 30 within the interior space 26 of the tube 20. To improve the adhesive bond between the end 38 of the radial element 32 and the interior surface 22 of the tube 20, one or more of the ends 38 can include an axial groove 43 running lengthwise in the outer surface 40 of the radial element 32. Alternatively, or in addition, the end 38 can include a circumferential notch or groove 44 for receiving adhesive. The axial groove 43 can be continuous along the length of the entire support member 30, or be discontinuous and spaced along the axial length of the support member 30. Similarly, the circumferential grooves 44 can be placed at various spacing intervals along the length (L1) of the support member 30.

Other mechanisms can also be employed between the ends 38 of the radial element 32 and the interior surface 22 of the tube 20 to form a reservoir for adhesive to improve the bond between the support member 30 and the tube 20.

Referring now to FIG. 3, there is shown a longitudinal sectional view of the propeller shaft of FIG. 2. As can be seen in FIG. 3, the length (L1) of the support member 30 can vary with respect to the length (L2) of the tube 20. Length (L1) designates the length of support member 30 and, as illustrated, also radial element 33. As illustrated, radial element 33 extend the length (L1) of support member 30, however, the present invention also contemplates other lengths and configurations for radial element 33. Also, for simplicity, end connecting members such as a stub shaft or inner or outer joint part have been omitted from FIG. 3. Such end connection members are represented generically by plugs 46 although such plugs 46 may also be employed in addition to a shaft connecting member. FIG. 3 further illustrates an additional embodiment having radial element 33 without the axial groove 43 as shown in FIG. 2. The various drawings are simply intended to show that the present invention is not limited to the radial elements 32, 33 having grooves 43.

With regard to the construction of the shaft 9, 10, the dimensions of the shaft will be determined by the natural bending frequency desired for the particular power transmission application. The dimensions of the propeller shaft tube can vary between 40 mm and 2500 mm in length (L2). Sufficiently short tubular shafts provide sufficiently high rigidity such that no support member 30 is required. With regard to the axial length (L1) of the support member 30, the ratio L1/L2 should not be less than 0.25 and not grater than 1.0. If the support member 30 does not span a sufficient length of the tube 20, the structural rigidity of the shaft assembly is only marginally improved, if at all. Similarly, the structural rigidity of the shaft assembly is not improved any further when the length of the support member 30 exceeds the length of the tube 20. Thus, it is unlikely that a tube assembly having a ratio L1/L2 greater than 1.0 would be necessary.

The thickness of the tube 20 ranges between 1 mm and 4 mm in the case of metal tubes and between 1 mm and 8 mm in the case of composite or carbon fiber tubes. In addition, the outer diameter (D3) of the tube 20 may vary between approximately 40 mm and 300 mm. Very small diameter metal tubes, when used in a vehicle driveline, cannot satisfactorily transmit torque even if a support member is used within the tube or the shaft. Also, very large diameter propeller shafts present packaging problems as they are likely to interfere with other vehicle components along the underside of the vehicle body.

Referring now to FIG. 4, there is shown a cross-sectional view of another embodiment of a propeller shaft in accordance with the present invention. The embodiment shown in FIG. 4 is similar in all respects to that of FIG. 2 with the exception that six radial elements 32' are shown instead of four. Thus, FIG. 4 represents another example of a spoke configuration for the center hub 34 and radial elements 32' of the support member 30' to improve the rigidity of the thin-walled tube 20. An even or odd number of radial elements 30, 32' can be employed with the number of radial elements 32, 32' varying between three and eight. Fewer than three radial elements are unlikely to increase the bending frequency of the completed propeller shaft and more than eight radial elements are unlikely to further increase the bending frequency of the propeller shaft without undesirably increasing the weight of the overall assembly. Additionally, FIGS. 2 and 4 illustrate radial elements 32, 32' as opposing pairs of radial elements 32, 32'. In FIG. 2 there are two opposing pairs of radial elements and in FIG. 4 there are 3 opposing pairs of radial elements. However, the present invention is not limited to any specific number or configuration of radial elements 32, 32'. The present invention contemplates any number of radial elements 32, 32' between three and eight configured as opposing pairs or independently.

From the foregoing, it can be seen that there has been brought to the art a new and improved propeller shaft which has advantages over prior propeller shaft assemblies. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A propeller shaft assembly comprising:
    a tubular member,
    a connecting member fixed to each end of the tubular member,
    a support member fixed within the tubular member, the support member comprising a plurality of radial elements extending a first length (L1) within the tubular member and engaging an interior surface of the tubular member to increase the bending frequency of the propeller shaft assembly, wherein said support member comprises a central hub coaxially located within said tubular member and wherein said plurality of radial elements extend from said central hub to said interior surface of said tubular member, wherein said support member has the first length (L1) and said tubular member has a second length (L2) and the ratio of L1/L2 is less than 1.0, and
    wherein each radial element includes an enlarged end portion having a groove formed therein for receiving an adhesive.

2. An assembly according to claim 1 wherein said enlarged end portion engages said tubular member interior surface.

3. An assembly according to claim 1 wherein said groove extends the first length (L1) of the respective radial element.

4. An assembly according to claim 1 wherein said groove is transverse to the first length (L1) of the respective radial element.

5. An assembly according to claim 1 wherein the number of radial elements is 3 to 8.

6. An assembly according to claim 1 wherein said tubular member comprises metal and said support member comprises metal, plastic, or reinforced plastic.

7. An assembly according to claim 1 wherein each radial element includes a plurality of openings formed along the first length (L1) for reducing the weight of the stiffening member.

8. An assembly according to claim 1 wherein the connecting members are joint elements or stub shafts.

9. A power transmission shaft comprising:
a metal tube having a joint element or stub shaft fixed to each end thereof, and
a support member co-axially located within said tube and engaging an interior surface of said tube,
said support member comprising a central hub and a plurality of radial elements extending between said central hub and said interior surface, each of the radial elements including an end portion for engaging said interior surface, wherein said support member has a first length (L1) and said tube has a second length (L2) and the ratio of L1/L2 is less than 1.0, and
wherein each end portion includes a groove formed therein for receiving an adhesive.

10. A power transmission shaft according to claim 9 wherein each radial element extends the first length (L1) of the support member.

11. A power transmission shaft according to claim 10 wherein each radial element includes a plurality of openings formed along the first length (L1) for reducing the weight of the stiffening member.

12. A power transmission shaft according to claim 9 wherein the number of radial elements is 3 to 8.

13. A power transmission shalt comprising:
a metal tube having a joint element or stub shaft fixed to each end thereof, and
a support member co-axially located within said tube and engaging an interior surface of said tube,
said support member comprising a central hub and a plurality of radial elements extending between said central hub and said interior surface, said plurality of radial elements forming opposing pairs of radial elements equally circumferentially spaced around said interior surface, wherein said support member has a first length (L1) and said tube has a second length (L2) and the ratio of L1/L2 is less than 1.0, and
wherein each radial element includes an end portion having a groove formed therein for receiving an adhesive.

14. A power transmission shaft according to claim 13 wherein the number of radial elements equals 4 and the number of opposing pairs of radial elements equals 2.

15. A power transmission shaft according to claim 13 wherein the number of radial elements equals 6 and the number of opposing pairs of radial elements equals 3.

* * * * *